Nov. 18, 1947.   R. S. AMES   2,431,102
METHOD OF CENTRIFUGALLY FORMING ASYMMETRIC PLASTIC SHEETS
Filed May 1, 1946   2 Sheets-Sheet 1
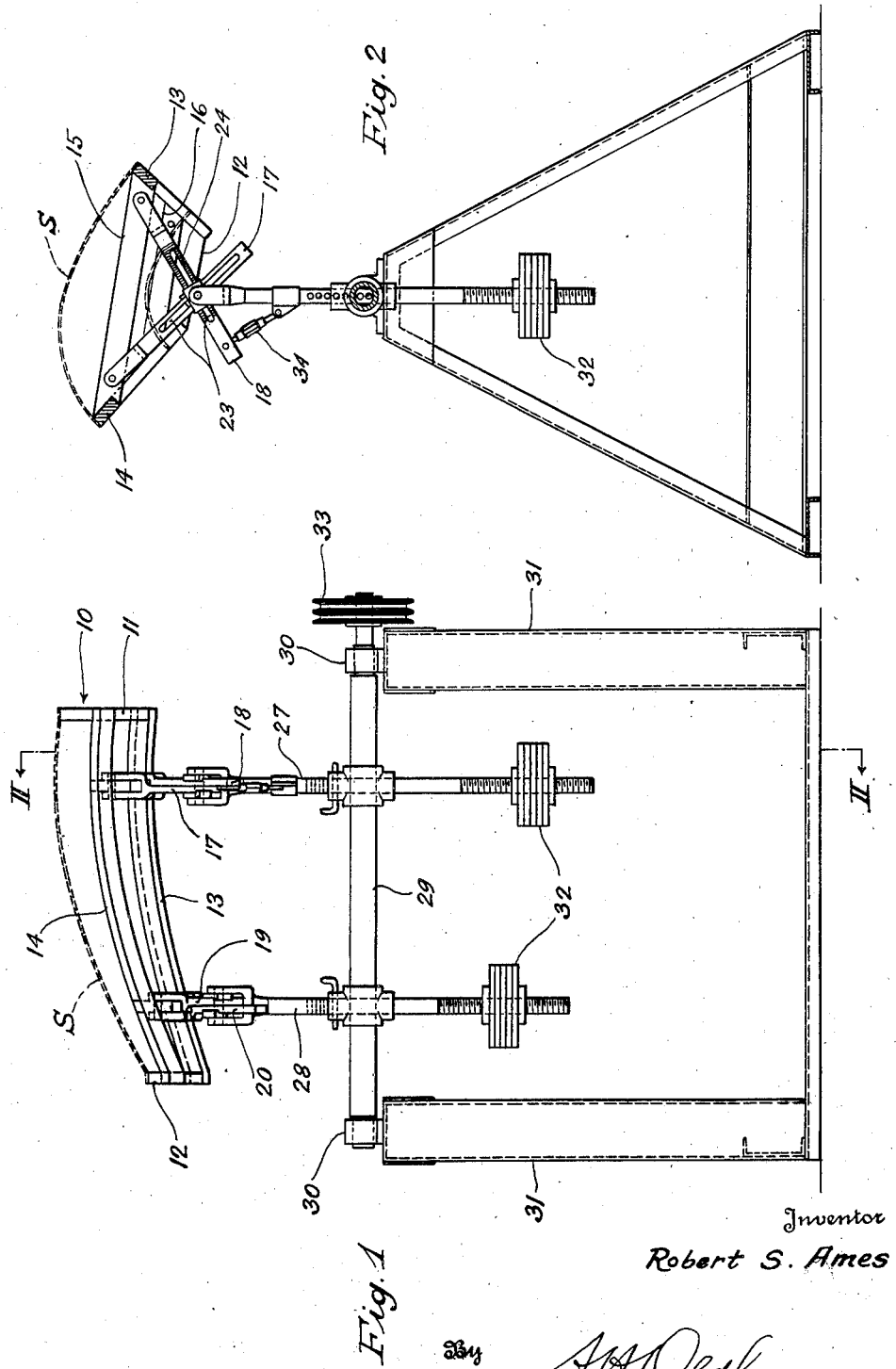
Inventor
Robert S. Ames
By A. H. Oldham
Attorney

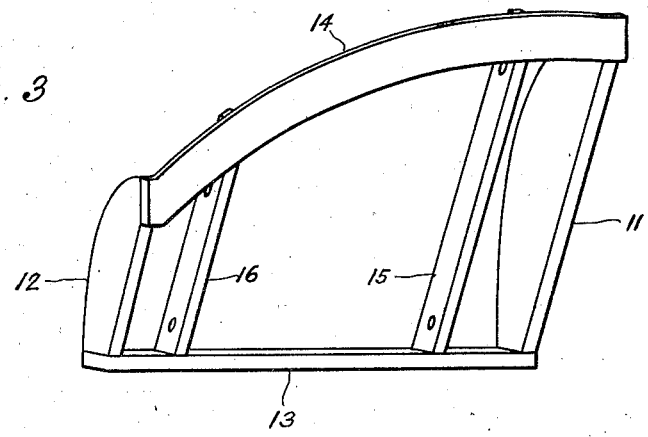
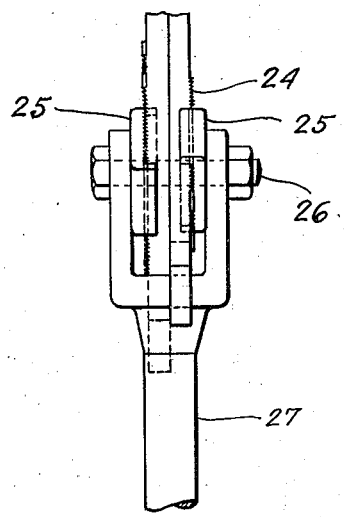
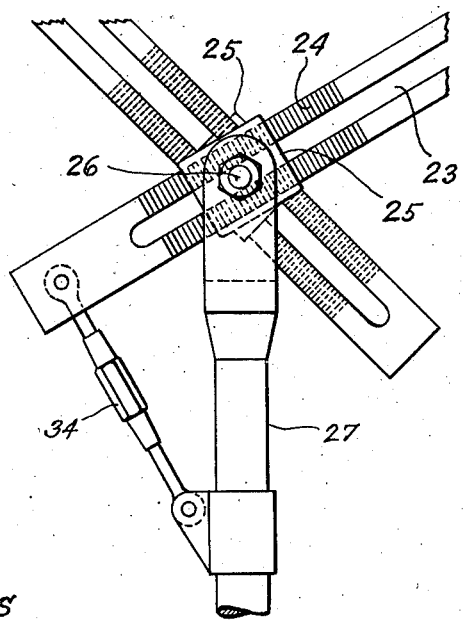
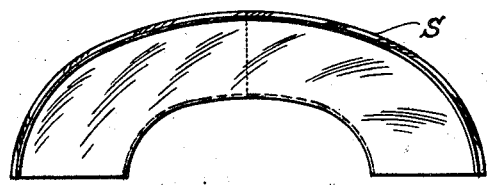

Patented Nov. 18, 1947

2,431,102

UNITED STATES PATENT OFFICE 2,431,102

METHOD OF CENTRIFUGALLY FORMING ASYMMETRIC PLASTIC SHEETS

Robert S. Ames, Akron, Ohio, assignor to Goodyear Aircraft Corporation, Akron, Ohio, a corporation of Delaware Application May 1, 1946, Serial No. 666,443

8 Claims. (Cl. 18—56)

This invention relates to methods of shaping thermoplastic material, especially to the centrifugal forming of streamlined articles from sheets of thermoplastic material.

The present invention relates to, and is a modification of, the invention shown and described in an application of Robert Mayne, Serial No. 585,504, filed March 29, 1945, and entitled "Methods and apparatus for centrifugally forming of sheet thermoplastics."

In the formation of transparent thermoplastics into articles, such as bubbles or canopies of airplanes, the optical properties of the formed material must be perfect. Hence, the use of form dies for such shaping is objectionable as it may mark the article formed and, while air blowing of a plastic sheet to form may not leave objectionable marks on the article produced, the article contour is practically limited to that of a half circle and this is undesirable in many instances.

It is the general object of this invention to avoid and overcome the foregoing and other objections to prior art practices used in fabricating articles from thermoplastic sheets by the provision of an improved method of forming thermoplastic sheets to specially shaped, streamlined contours.

Another object of the invention is to provide an inexpensive, easily operated method of forming relatively wide, low height articles, which are of substantially parabolic form in sections, from thermoplastic material.

A further object of the invention is to provide a method of centrifugally forming half sections of articles not readily capable of formation by other methods.

Another object of the invention is to use a jig, the edge members of which are asymmetric with relation to a support shaft, in centrifugal formation of plastic sheets.

The foregoing objects of the invention, and other objects which will be made apparent as the specification proceeds, are obtained, generally speaking, by securing the edges of a heated thermoplastic sheet to a jig, which is in the form of a longitudinal section of the article desired, mounting the jig for rotational movement with the longitudinal edges of the jig asymmetrically positioned, and rotating the jig to form the sheet to the desired shape. A jig, which mates with the first jig to form, generally speaking, the desired article then is used to form the second article section. The sections are trimmed and then associated to form the end article desired.

For a better understanding of the invention, reference should be had to the accompanying drawings, wherein:

Fig. 1 is an elevation of one form of apparatus, shown diagrammatically, for practicing the principles of my invention;

Fig. 2 is a cross-sectional view of the apparatus taken at line II—II of Fig. 1;

Fig. 3 is an enlarged perspective view of the jig portion of the apparatus and better illustrating its construction;

Fig. 4 is an enlarged fragmentary side view of the angularly and laterally adjustable connection between the jig and the jig support arms;

Fig. 5 is a front view of the connection shown in Fig. 4; and

Fig. 6 is a front view of a completed article consisting of two opposite halves produced separately.

Referring more specifically to the drawings, which reveal one form of apparatus for centrifugally forming thermoplastic sheets, there is shown a jig 10 which usually includes curved end members 11 and 12 and curved longitudinal edge members 13 and 14.

The longitudinal edge members 13 and 14 are connected by transverse members 15 and 16 to each of which is hinged a set of crossing links 17, 18 and 19, 20, respectively. These links are provided with longitudinal slots 23, and with serrations or teeth 24 on their flat outside surfaces. Channel-shaped plates 25, correspondingly serrated on their inside, are fitted over these links at their intersections and are matching with the link serrations to be held in place by bolts 26 which also attach the sets of links to the longitudinally adjustable supporting arms 27 and 28 passing through and being secured to the rotatable shaft 29 which is journaled in bearings 30 supported by frames 31. To the ends of the supporting arms 27 and 28 opposite those to which the jig is attached, weights 32 are adjustably fastened for counterbalancing the rotatable system which is driven by pulleys 33 from a power source (not shown).

The intersection of the links may be so positioned that the center line of the supporting arms passes substantially through the cross-sectional center of gravity of the jig, including the plastic sheet S to be formed. Turnbuckles 34, or comparable means, are inserted between one or more of the links and the supporting arms to hold the jig against turning relative to the supporting arms and to facilitate adjustment of the jig relative to the supporting arms. The serrations 24 on the links 17, 18 and 19, 20, and plates 25 completely prevent slippage of the bolts 26 in the link slots 23.

The invention contemplates any asymmetric arrangement of the edge members 13 and 14 with relation to the axis of rotation of the shaft 29. Thus, asymmetric shapes can be obtained, which shapes could not be directly obtained by other forming process known to me. A special type of article, which can be produced only by the present invention, is a low, broad, contoured article S, as shown, for example, in Fig. 6. Whereas, centrifugal formation with longitudinal edge members symmetrically positioned with respect to the axis of rotation usually is applied for elongated articles having a height at least half that of their width, the present arrangement is particularly applied for articles having a height smaller than half their width, and for articles which would be difficult to be made in a single piece.

The cross-sectional shape of articles produced by the centrifuge method is substantially parabolical, with the specific contour depending on the type of sheet used, its temperature, the position of the jig relative to the supporting arms and the rotating shaft, duration of and speed of rotation, and other factors.

Whereas the edge contours of the article are definitely defined by the contours of the jig edge members to which the sheet to be formed is clamped, the dimensions of its contours between these edges may vary within certain limits. These contours are obtained by properly placing the jig in the apparatus and by a specific temperature of the sheet when the jig is started to be rotated at a given speed. It will be understood that by moving the longitudinal bottom jig edge member 14, near which a sharper cross-sectional curvature is desired, farther away from the axis of rotation than the longitudinal top jig edge member 13, the centrifugal force will be more effective on that side and will produce a sharper transverse curve than along the other side. If necessary, various adjustments can be made to obtain the desired effect. By changing the intersection of the jig links, the jig can be always so positioned as to effect the desired forming action, and that the direction of the supporting arms may pass substantially through the cross-sectional center of gravity of the rotating system to avoid undue stresses in the apparatus as much as possible.

After formation of an article by the apparatus shown, then a mating sectional article is usually formed by a jig similar to the jig 10 but of opposite hand. Then after trimming the edges of the sections formed, they are cemented or otherwise secured together to form the desired hood, canopy or other article. Of course, the method of the invention may be utilized to form single sheets to canopy or other form without requiring the assembly together of separately formed parts.

While the invention is generally applicable to thermoplastic materials, it is especially useful in the formation of transparent plastics such as methyl methacrylate, which is better known as "Plexiglas."

From the foregoing, it will be seen that an inexpensive easily practiced method of forming novel and desirably shaped articles has been provided and that the objects of the invention have been realized.

While in accordance with the patent statutes, one embodiment of apparatus for practicing the invention has been specifically illustrated and described, it should be clearly understood that the scope of the invention is not limited thereto, or thereby, but is defined in the appended claims.

What is claimed is:

1. That method of forming thermoplatic sheets by a jig having relatively long longitudinal edges and relatively short transverse end edges and capable of rotation by centrifugal apparatus comprising the steps of securing the jig to the centrifugal apparatus at the desired distance from the axis thereof and with one longitudinal edge of the jig being positioned at a different distance from the rotational axis than the other longitudinal edge, heating a sheet, securing all of the edges of the sheet to the jig but leaving the center portion of the sheet unsupported, rotating the jig, and periodically adjusting the speed of rotation to effect movement of the center portion of the sheet to the desired contour and no farther.

2. That method of forming thermoplastic sheets by a jig having relatively long longitudinal edges and relatively short transverse end edges and capable of rotation by centrifugal apparatus comprising the steps of securing the jig to the centrifugal apparatus at the desired distance from the axis thereof and with the longitudinal edges of the jig being at different distances from the rotational axis, heating a plastic sheet uniformly to a temperature high enough to render it capable of bending and stretching, placing the heated sheet over the jig, securing all of the edges of the sheet to the jig but leaving the center portion of the sheet unsupported, rotating the jig at requisite speed until the center portion of the sheet has assumed the desired contour, and cooling the sheet while it is retained in such contour.

3. That method of making longitudinal sections of canopies, bubbles, or like articles from a substantially rectangular piece of thermoplastic sheet material comprising the steps of heating the sheet, securing a pair of opposed longitudinal edges of the sheet to a support, mounting the support for rotation with the secured edges of the sheet being spaced adjustable but different distances from the rotational axis, rotating the support.

4. That method of making longitudinal sections of canopies, bubbles, or like articles from an oblong methyl methacrylate sheet comprising the steps of securing the longitudinal edges of a sheet to a support while the sheet is in a pliable condition, mounting the support asymmetrically so that the longitudinal edges of the sheet are different distances from an axis of rotation, and rotating the support to centrifugally form the sheet to different degrees adjacent the separate longitudinal edges.

5. That method of making longitudinal sections of canopies, bubbles, or like articles from thermoplastic sheet material comprising the steps of heating the sheet, securing the edges of the heated sheet to a support, positioning the support so that opposite longitudinal edges of the support are at different radii from the axis of rotation, and rotating the support to centrifugally form the sheet.

6. That method of forming relatively broad, low contoured articles from thermoplastic material comprising the steps of providing a jig in the form of substantially a longitudinal half section of the article, positioning the jig for rotation with the longitudinal edges thereof being asymmetric with relation to the axis of rotation, securing the edges of a pliable plastic sheet to the jig, rotating the jig to form the unsupported portion of the sheet to the desired shape, providing a jig of a substantially mating sectional shape to the first jig, positioning such second jig for rotation in a manner similar to but of opposite hand from that of the first jig, securing the edges of a pliable plastic sheet to the second jig, rotating the second jig to form the unsupported center portion of the sheet thereon to the desired form, trimming the mating sectional articles obtained, and associating the sectional articles to form a relatively broad low contoured article.

7. That method of forming an airplane canopy or the like including the steps of heating the sheet material to render it semi-plastic, supporting longitudinal edges of the sheet in positions substantially parallel to an axis of rotation, adjusting the distance of each longitudinal edge of the sheet relative to the axis of rotation to position the respective longitudinal edges at different distances from the axis, rotating the supported sheet to centrifugally form it, repeating the operation while supporting a second sheet by opposite hand, trimming the formed sheets, and assembling the sheets together.

8. That method of forming an airplane canopy or the like including the steps of heating the sheet material to render it semi-plastic, supporting longitudinal edges of the sheet in positions substantially parallel to an axis of rotation but with each longitudinal edge being positioned at a different distance from the axis of rotation, rotating the supported sheet to centrifugally form it, repeating the operation while supporting a second sheet by opposite hand, trimming the formed sheets, and assembling the sheets together along their longitudinal edges positioned during forming on the shortest distance to the axis.

ROBERT S. AMES.

REFERENCES CITED

The following references are of record in the file of this patent:

UNITED STATES PATENTS

| Number | Name | Date |
|---|---|---|
| 2,167,539 | Vienneau | July 25, 1939 |
| 2,220,545 | Reinhardt | Nov. 5, 1940 |